(12) United States Patent
Andrews et al.

(10) Patent No.: US 7,710,900 B2
(45) Date of Patent: May 4, 2010

(54) METHOD AND SYSTEM FOR PROVIDING NETWORK MANAGEMENT BASED ON DEFINING AND APPLYING NETWORK ADMINISTRATIVE INTENTS

(75) Inventors: Robert Andrews, Morgan Hill, CA (US); Navindra Yadav, San Jose, CA (US); Shree Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 520 days.

(21) Appl. No.: 11/470,240

(22) Filed: Sep. 5, 2006

(65) Prior Publication Data

US 2008/0056156 A1    Mar. 6, 2008

(51) Int. Cl.
*H04L 12/28* (2006.01)
(52) U.S. Cl. ...................................... 370/254
(58) Field of Classification Search ................. 370/254, 370/408, 419; 379/112.05; 709/220–226
See application file for complete search history.

(56) References Cited

U.S. PATENT DOCUMENTS 5,751,967 A * 5/1998 Raab et al. ................. 709/228
6,484,261 B1 11/2002 Wiegel 2002/0078383 A1 6/2002 Leerssen et al.

OTHER PUBLICATIONS

International Search Report and Written Opinion of the International Searching Authority for PCT Application No. PCT/US2007/077008 filed Aug. 28, 2007 to Cisco Technology, Inc.

* cited by examiner

*Primary Examiner*—Chirag G Shah
*Assistant Examiner*—Yong Zhou
(74) *Attorney, Agent, or Firm*—Cesari and McKenna, LLP; Michael R. Reinemann (57) ABSTRACT

Method and system for providing a dynamic network configuration and management based on defining and applying high level administrative intents including retrieving one or more attributes associated with one or more logical groups in a network, determining one or more network policies based on the one or more retrieved attributes, associating the one or more logical groups to a respective network group identifier, and generating a network group list associated with the one or more network group identifiers, is disclosed.

21 Claims, 6 Drawing Sheets

METHOD AND SYSTEM FOR PROVIDING NETWORK MANAGEMENT BASED ON DEFINING AND APPLYING NETWORK ADMINISTRATIVE INTENTS

FIELD OF THE INVENTION

The present invention relates to data network management. More specifically, the present invention relates to data network monitoring and management based on defining and applying network administrative intents to network entities.

BACKGROUND

Large network maintenance typically is an ongoing, error prone, arduous process, where changes in the network require substantial planning and voluminous configuration changes spanning the devices that support the network. Examples of such changes include, but are not limited to the addition of new hardware or software, new hosts or users to the network, or similarly, network changes associated with hosts and/or users leaving the network.

Indeed, with the increase in the network size and complexity, it is increasingly difficult to configure and maintain the switches, routers and other network devices that manage the data network. The network administrator must take into account not only how the network is designed, and its configuration, but also, how the network devices that support the network interact with each other.

Existing approaches for setting up of Switched Port Analyzer (SPAN) sessions in the network are generally limited in functionality as they are implemented as add-ons to the network. A SPAN session is an association of a destination interface with a set of source interfaces and is used for network traffic monitoring. For example, one approach includes the examination of the configuration files on network devices, and by snooping packets. A limitation of this approach is that the configuration files on the network devices are not a substitute for the know-how of the administrator that initially configured the network. While the configuration files in the network devices provide the properties of the network configuration, they do not typically provide the reasons behind the properties for the configuration in the network. Thus, any reconfiguration of the network without fully comprehending the reasons behind the properties for the configuration of the network devices may not yield the correct or optimum configuration.

Furthermore, with respect to the challenge of the network configuration changes over time, network add-ons may not be configured to be fully integrated into every network device in the network, and thus, cannot reliably track the users and hosts as they migrate within the network, changing the network topology. Moreover, existing approaches cannot track users or groups of users because of their dynamic nature— that is, users can migrate from machine to machine within the network, while hosts can migrate from port to port.

In view of the foregoing, it would be desirable to have methods and systems for data network monitoring and management based on dynamically defining and applying one or more intents associated with network policies to one or more network entities.

DETAILED DESCRIPTION

Figure 1A:
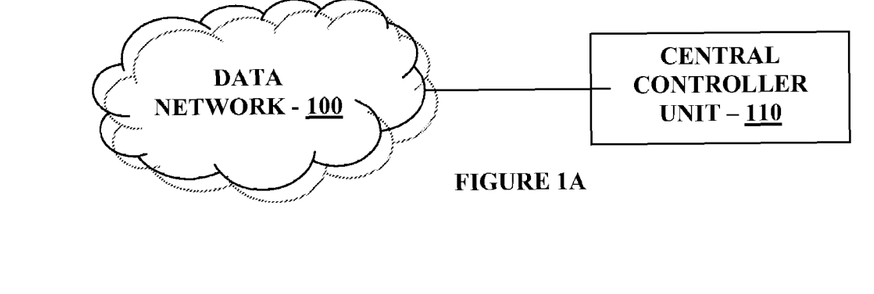
FIG. 1A is a block diagram of an overall data network for practicing one or more embodiments of the present invention.
Figure 1B:
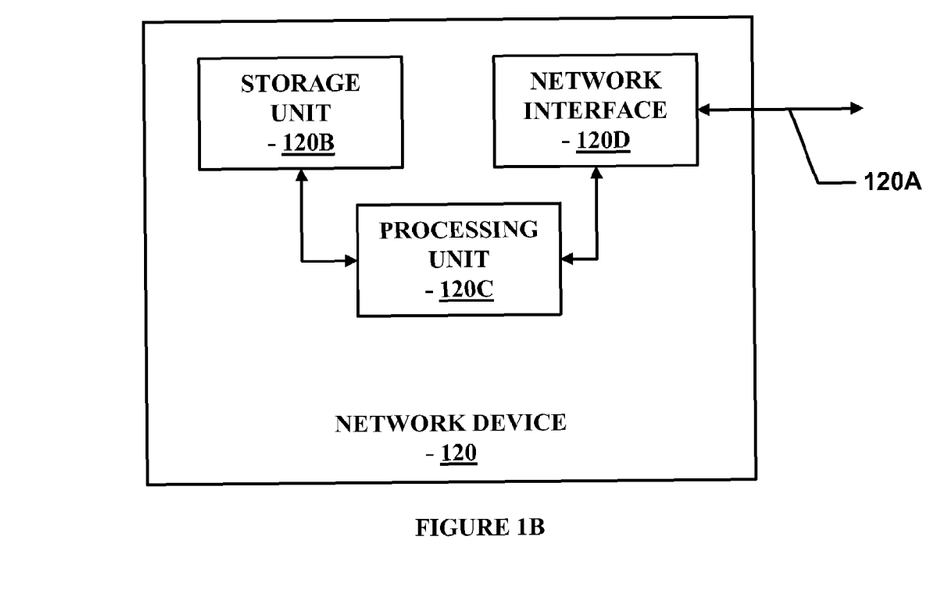
FIG. 1B is a block diagram of a network device in the data network of FIG. 1A for practicing one or more embodiments of the present invention.

FIG. 1A is a block diagram of an overall data network coupled to a central controller and FIG. 1B is a block diagram of a network device in the data network of FIG. 1A for practicing one or more embodiments of the present invention. Referring to FIGS. 1A-1B, there is provided a central controller unit 110 operatively coupled to a data network 100. In one embodiment, the data network 100 may include one or more local area networks (LANs) or a wide area network (WAN) that is operatively coupled to and is subject to the configuration control by the central controller unit 110.

Referring to FIG. 1B, the network device 120 in one embodiment includes a storage unit 120B operatively coupled to a processing unit 120C. In one aspect, the processing unit 120C may include one or more microprocessors for retrieving and/or storing data from the storage unit 120A, and further, for executing instructions stored in, for example, the storage unit 120A, for implementing one or more associated functions. Referring again to FIG. 1B, in one aspect, the network device 120 is also provided with a network interface 120D which is operatively coupled to a port 120A, and may be configured to interface with other network devices or client terminals in the data network 100 (FIG. 1A) as well as the central controller unit 110.

In one embodiment, as discussed in further detail below, the memory or storage unit 120B of the network device 120 may be configured to store instructions which may be executed by the processing unit 120C to perform one or more functions associated with one or more embodiments of the data monitoring and management based on dynamically defining and applying one or more intents associated with network policies as described in further detail below.

Referring again to FIG. 1B, while network device 120 is shown with one storage unit 120C, one processing unit 120C, one network interface 120D, and one port 120A, within the scope of the present invention, the network device 120 may be provided with multiple storage units (for example, multiple memory devices including read-only memory, random access memory, and the like), multiple processing units (such as, for example, a plurality of microprocessors, each with one or more dedicated functions), and additional network interfaces and ports to operatively couple to one or more other network devices and client devices of the data network 100 as shown in FIG. 1A.

More particularly, in one embodiment, the central controller unit 110 may be configured to be in complete control of the network devices (for example, the network device 120 shown in FIG. 1B, or a plurality of such network devices 120) within the data network 100—that is, the network devices which support the network 100. For example, the central controller unit 110 in one embodiment may be responsible for the configuration of VLAN trunking protocol (VTP) which is the mechanism used to specify overlays of each logical network (VLAN) over the physical network in the data network 100.

Referring again to FIGS. 1A-1B, in one embodiment, ports 120A of network devices 120, and clients or user terminals that connect to the ports 120A may be represented in a tree data structure. Indeed, a hierarchical physical group tree may be generated to represent a network topology. Furthermore, nodes in the physical group tree may be configured to represent abstractions such as such as locations, devices, attributes, where the nodes map to physical ports of devices in the network 100. A logical group tree in one embodiment may represent a group of clients, such as user categories, and device categories, where the nodes in the logical group tree map to clients.

Figure 2:
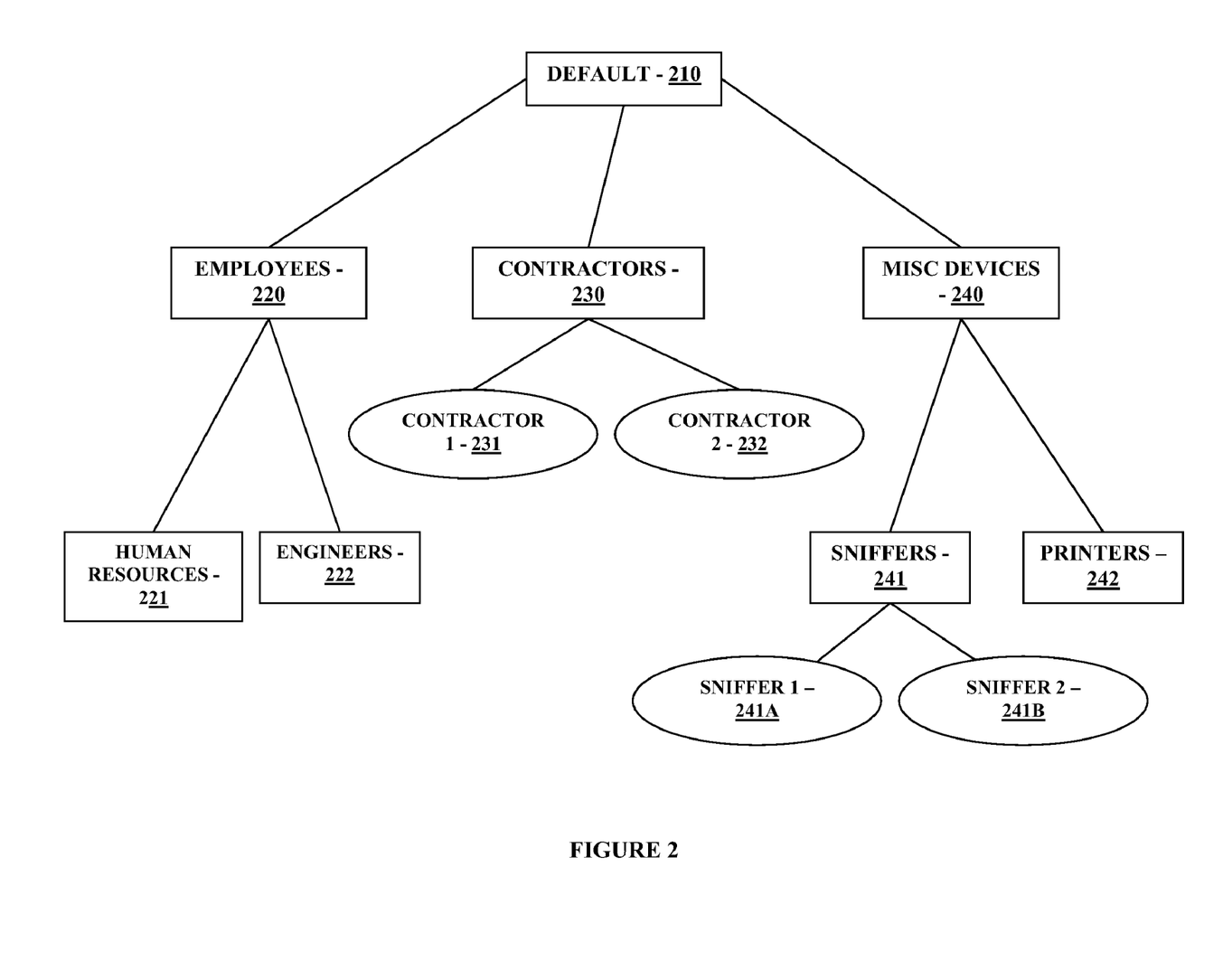
FIG. 2 is a block diagram illustrating a logical group hierarchy in the data network 100 of FIG. 1A in one embodiment of the present invention.

FIG. 2 is a block diagram illustrating a logical group hierarchy in the data network 100 of FIG. 1A in one embodiment of the present invention. Referring to the Figure, under the default group 210, there are provided three logical groups including employees group 220, contractors group 230 and miscellaneous devices 240. Moreover, each of these groups in turn includes additional members. For example, the human resources 221 and the engineers 222 are members of the employees group 220, while contractor 1 231 and contractor 2 232 are members of the contractors group 230. Additionally, it can be seen from FIG. 2 that sniffers 241 and printers 242 are members of the miscellaneous devices 240 group. In addition, it can be further seen that sniffers 241 also includes several members including sniffer 1 241A, and sniffer 2 241B.

In this manner, in one embodiment of the present invention, each network device, user, client terminal or host may be mapped in a hierarchy and in logical groups based on the network level configuration (for example, based on high level intents). In addition, within the scope of the present invention, the central controller unit 110 may be configured to monitor both the source and the destinations of the monitored traffic that are logical groups, and thus taking into account the dynamic logical group membership of destinations for the monitored traffic group, and further configured to modify the actual network configuration as the destinations for the monitored traffic dynamically changes.

In one embodiment, the central controller unit 110 monitoring the traffic in the network 100 may be configured to apply the one or more attributes of the user or host in the network 100 to the appropriate groups in the hierarchy such that changes in the network topology is continuously monitored by the central controller unit 110 and dynamically configured to apply the appropriate network attributes associated with the changes in the network topology in the group hierarchy.

Both physical groups and logical groups have attributes which may be applied to ports, or to systems that are connected through ports, when the port becomes a member of the group. However, physical groups contain attributes that affect all communications in and out of a port such as for example, speed, duplex, storm-control settings. Moreover, physical group attributes also provide the rules by which the logical groups for users connected through the ports are selected. On the other hand, the attributes of logical groups do not necessarily affect all communications in and out of a port to one or more networks or systems.

Examples of logical group attributes include, for example, VLAN and Access Control Entries (ACEs) and network monitoring parameters. Indeed, since the attributes that the logical groups have do not physically affect the port, and thus do not affect all communications that pass through the port, a port may be a member of more than one logical group at a time. By contrast, each port is a member of exactly one physical group, as the attributes of the physical group affect all communications that pass through the ports.

Logical group membership on a port is the mechanism by which port settings that pertain to an attached network client are dynamically applied to the port under consideration. In one aspect, logical group membership may be defined by port, MAC address, by authentication, or by voice-VLAN. That is, rules for specification of logical group membership on ports is achieved by specifying a logical group membership rules in the physical group which the port is a member of (or in a physical group whose properties are inherited by the physical group which the port is a member of).

For example, to define a logical group membership by port, a parameter may be set on a port such as an interface, by setting a property in a physical group that specifies that any system connected to the network through a port with that property is a member of a specified logical group. A logical group membership definition by MAC address may include a property that may be set in a physical group which specifies that the system with a specific MAC address is a member of a specified logical group if the system is detected on a port which is a member of the physical group with the property, or a member of a physical group which is inheriting the property. The mapping between MAC addresses and logical groups may be stored as static physical group configuration data in the central controller unit 110.

In the case of defining a logical group membership based on authenticated user, a property may be set in a physical group which specifies that the system that authenticates in a specified manner (e.g., using an opaque string obtained from the authentication service at the time that a network device is connected to a port and engages in IEEE 802.1x authentication), is a member of the specified logical group. Further, in the case of defining the logical group membership by voice-VLAN, a property in a physical group may be set which specifies that any client that communicates with the switch that request a voice VLAN is instructed to use the VLAN configured for the logical group—and the client is then automatically authenticated with the specified logical group.

Referring back to FIGS. 1-2, in one embodiment, after each network device, user or host is mapped in a hierarchical tree, the network administrator links nodes based on the administrator's intents, to allow or refuse one or more predetermined actions in the network 100. For example, the network administrator's intent may reflect, in one embodiment, a specified user or host has permission to communicate with another one more specified users or hosts in the network. Alternatively, the network administrator's intent may be defined as being applicable to a specified or predetermined logical group (for example, the contractors 230 (FIG. 2)).

In a further aspect, the network administrator's intent may also indicate a desired quality of service (QoS) for clients or ports of the network 100, services that the network must provide for the clients or ports, monitoring of particular ports or clients, call tracing from a given user to another user in the network 100, or other desired operations or services for managing and configuring the network 100. In one aspect, the desired intent may be specified by the network administrator in the user interface by, for example, linking tree nodes and generating associated properties for the links.

With the network hierarchy established and the network administrator intents specified, when clients enter or leave the network 100 by, for example, connecting to a port in the network 100, the one or more applicable administrator's intents may be automatically applied to the clients. More specifically, one or more predetermined device configurations may be generated and applied without the need for the administrator's action or intervention. In a further aspect, the one or more intents associated with a particular client leaving or entering the network 100 may be generated or identified in advance of the client's actual leaving or entering the network 100, respectively, and thereafter, applied to the particular client upon leaving or entering the network 100.

In this manner, in one embodiment, the network administrator may approach the data network 100 as a single entity, and the specified administrator's intents may be automatically implemented, for example, one or more predetermined device configurations. As such, in accordance with the various embodiments of the present invention, the network administrator may define the intended services, allowed traffic, quality of service (QoS) parameters, and other network features and/or configurations, and may be applied to clients or network devices as they enter or leave the network 100 in a dynamic manner.

Figure 3:
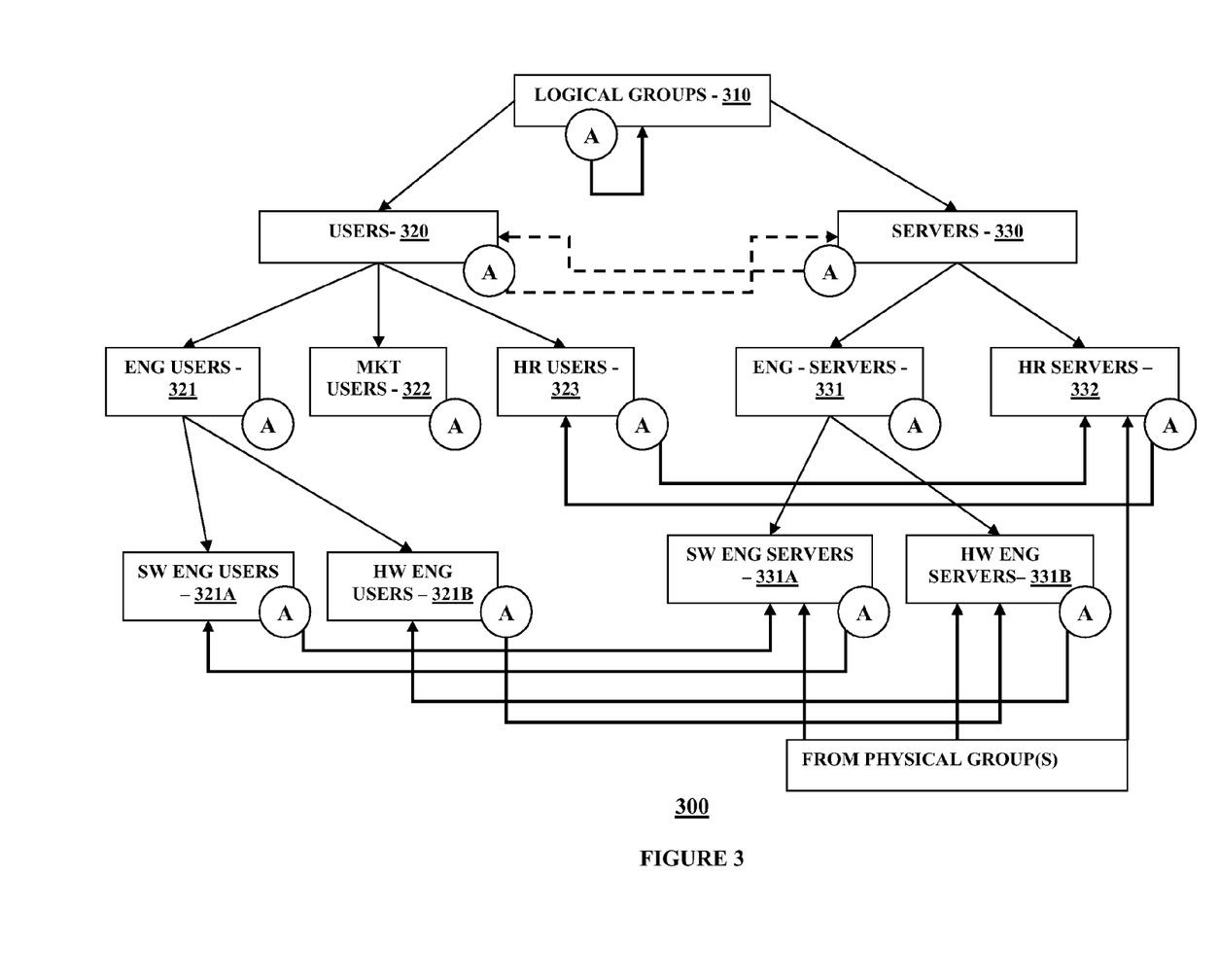
FIG. 3 is a block diagram illustrating the logical group hierarchy database configuration associated with the central controller unit 110 in one embodiment of the present invention.

FIG. 3 is a block diagram illustrating the logical group hierarchy database configuration associated with the central controller unit 110 in one embodiment of the present invention. Referring to FIG. 3, database 300 associated with the central controller unit 110 (FIG. 1A) may be configured in one embodiment to store the hierarchical logical groups 310 as shown. More specifically, referring to FIG. 3, attributes "A" associated with the logical groups 310 are provided as reference links associated with a permit Access Control Entries (ACEs) as shown by the solid arrow indication. Referring to FIG. 3, at a lower level of hierarchy in the logical groups, there is provided users logical group 320 and servers logical group 330, each associated with the corresponding attributes "A".

The dotted arrow from the attributes "A" of the users logical group 320 to the servers logical group 330, and the dotted arrow from the attributes "A" of the servers logical group 330 to the users logical group 320 indicate reference links associated with a deny Access Control Entries (ACEs). That is, in the configuration shown in FIG. 3, the central controller unit 110 (FIG. 1A) is configured in one embodiment so that the users logical group 320 and the servers logical group 330 are not configured to communicate with each other directly.

More specifically, in one embodiment of the present invention, not all of the members of the users logical group 320 may be configured to communicate with the members of the servers logical group 330. That is, referring back to FIG. 3, the engineering users member (Eng Users) 321 and the marketing users member (Mkt Users) 322 are not configured to communicate with the members (e.g., engineering servers (Eng Servers) 331 and human resources member (HR servers) 332) of the servers logical group 330. Referring to FIG. 3, this is shown by the absence of an arrow from the respective attribute "A" of the users logical group 320 members, to a corresponding member of the servers logical group 330.

On the other hand, it can be seen from FIG. 3 that the human resources member (HR Users) 323 in the users logical group 320 has an arrow from its attributes "A" to the human resources member (HR Servers) 332 of the servers logical group 330, while the human resources member (HR servers) 332 of the servers logical group 330 has an arrow from its attributes "A" to the human resources member (HR Users) 323 in the users logical group 320. In this case, the attributes "A" of the HR Users 323 member of the users logical group 320 are associated with reference links to the a permit ACEs to the HR servers member 332 of the servers logical group 330. Accordingly, the central controller unit 110 (FIG. 1A) is configured to associate high level intents of the HR users member 323 in the users logical group 320 to the HR servers member 332 in the servers logical group 330 and vice versa, such that any change that affects the network topology or configuration associated with the HR users member 323 of the users logical group 320 are dynamically reflected in the HR servers member 332 of the servers logical group 330. Likewise, changes that affect the network topology or configuration associated with the HR servers member 332 of the servers logical group 330 are dynamically reflected in the HR users member 323 of the users logical group 320.

Referring back to FIG. 3, at the next level in the logical group hierarchy, the members of the engineering users logical group 321 are respectively associated with a corresponding member of the engineering servers logical group 331. In other words, as shown in FIG. 3 by the solid arrows originating from the attributes "A" of a users logical group member (software engineering users member 321A, and hardware engineering users member 321B) to a respective member (e.g., software engineering servers member 331A, and hardware engineering servers member 331B) of the engineering servers logical group 331, the appropriate reference links are associated with a permit ACE.

Moreover, the respective attributes "A" of the members of the engineering servers logical group 331 (software engineering servers member 331A, and hardware engineering servers member 331B) are provided with solid arrows as shown in FIG. 3 to the respective member of the engineering users logical group 321 (i.e., software engineering users member 321A, and hardware engineering users member 321B), indicating respective reference links associated with permit ACEs.

In the manner described above, in one embodiment of the present invention, the central controller unit 110 (FIG. 1A) is configured to dynamically manage the data flow in the data network 100 such that, for example, with reference to FIG. 3, members of certain logical groups are configured to communicate with the members of a corresponding other logical groups within the logical group structure of the network 100 such that the central controller unit 110 may be configured to dynamically configure the member network devices within a given logical group with the high level intents associated with the changes in the network attributable to the given logical group.

In one embodiment, the central controller unit 110 is configured to manage each user and host present in the network 100 such that the central controller unit 110 is configured to implement and dynamically maintain cross-network monitor port/flow sessions. Since the central controller unit 110 has knowledge of every user and every host in the network, it is capable of comprehensive network monitoring and not limited to static monitoring of specific types of network traffic.

As the central controller unit 110 may be in one embodiment configured to maintain a monitor session between two handles, and given that the central controller unit 110 is the sole entity for maintaining intra-network configuration (thus fully aware of the network topology at all times), the central controller unit 110 may be capable of setting up and managing the necessary configurations on the network devices to maintain the monitor session without any administrative intervention as the network changes. Some examples of the network change discussed above includes, but not limited to user authentication in more than one host, user migration within the network, host migration within the network, and network topology change.

In this manner, the central controller unit 110 may be provided to the data network 100 to configure all network devices within an administrative domain. The network administrator, rather than configuring each network device in the network 100, configures the central controller unit 110 with high level intents for dynamic properties of the network configuration. In turn, the central controller unit 110 may be configured to translate the high level intents into low level implementation details dynamically on an ongoing basis, and to maintain the configuration of each network device on the network 100.

Accordingly, all hosts or users joining or leaving the network 100 may be under the direct supervision of the central controller unit 110. This is valid regardless of the authentication mechanism used (such as the IEEE 802.1x). In the cases where the users or hosts do not authenticate with user name and/or passwords, they authenticate with location or MAC addresses. In this manner, the central controller unit 110 in one embodiment is configured to reliably monitor and apply the relevant policies to the users and hosts as they migrate within the network 100 being monitored and managed. Also, in one aspect, a user or host that is not tracked by the central controller unit 110 may not be permitted into the network 100.

Figure 4:
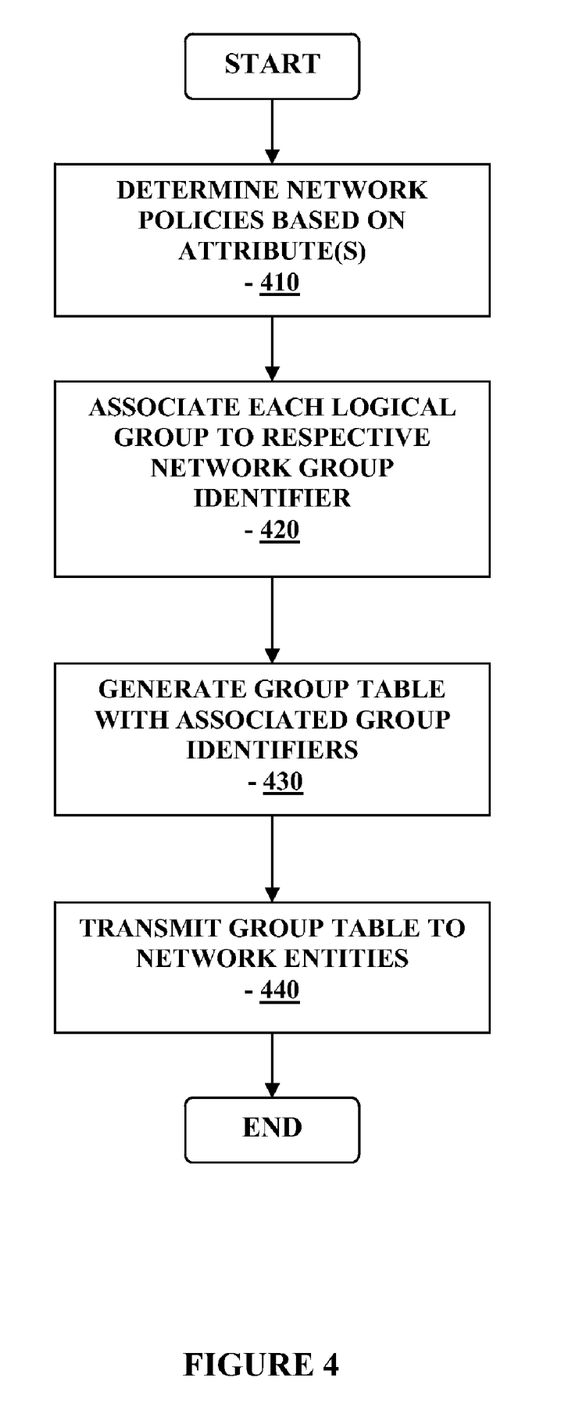
FIG. 4 is a flowchart illustrating the intent based network configuration and management in accordance with one embodiment of the present invention.

FIG. 4 is a flowchart illustrating the intent based network configuration and management in accordance with one embodiment of the present invention. Referring to FIG. 4, at step 410, the network policies representing the network administrator's intent is determined based, in one embodiment, on physical and logical group attributes. For example, in one embodiment, the physical group attributes represent the manner in which the logical groups are selected (that is, for example, how network clients are logically classified in the network). Moreover, the logical group attributes represent the policies such as, for example, but not limited to, network security, and quality of service (QoS), to apply to users or clients which are members of the respective logical groups.

Referring back to FIG. 4, after determining the network policies based on the associated attributes for the logical groups in the network, in one embodiment, at step 420, each attribute is associated or correlated with a corresponding network group identifier, such as a group descriptor including, but not limited to a Cisco Trusted Security tag (or referred to as source group tag (SGT)). In one embodiment, the network group identifier associated with each logical group may be configured such that, given a data packet flowing through the network 100 (FIG. 1A), the network group identifier may be used to identify from which logical group in the network 100 the packet originated.

Thereafter at step 430, referring again to FIG. 4, a group table is generated and stored, where the group table may include the network group identifiers associated with each logical group in the network 100. At step 440, the generated group table is transmitted to one or more switchware capable devices in the network 100 (FIG. 1A) to configure associated network entities or clients to implement the relevant network policies based on the logical groups and the associated network group identifiers.

Referring back to FIGS. 1 and 4, in one embodiment, the central controller unit 110 (FIG. 1A) is configured to maintain all switchware capable devices in the network 100, and is further configured with the most up to date group table. More-over, the central controller unit 110 may be further configured to maintain all switchware capable devices in the network configured with network policies indexed by the logical groups of the network 100. For example, in one embodiment, the central controller unit 110 may be configured to maintain a two-dimensional table including security policies between logical groups in the network 100. In addition, the central controller unit 110 may be additionally configured to maintain a one-dimensional table for quality of service (QoS) that each logical group is to maintain with the respective clients in the network 100 (FIG. 1A).

In this manner, when a network policy change occurs, the central controller unit 110 may be configured to update the group table including the network policies, and to send the updated group table to the switchware capable devices in the network such that the updated or changed network policy may be substantially immediately implemented throughout the network 100 without network administrator intervention.

Figure 5:
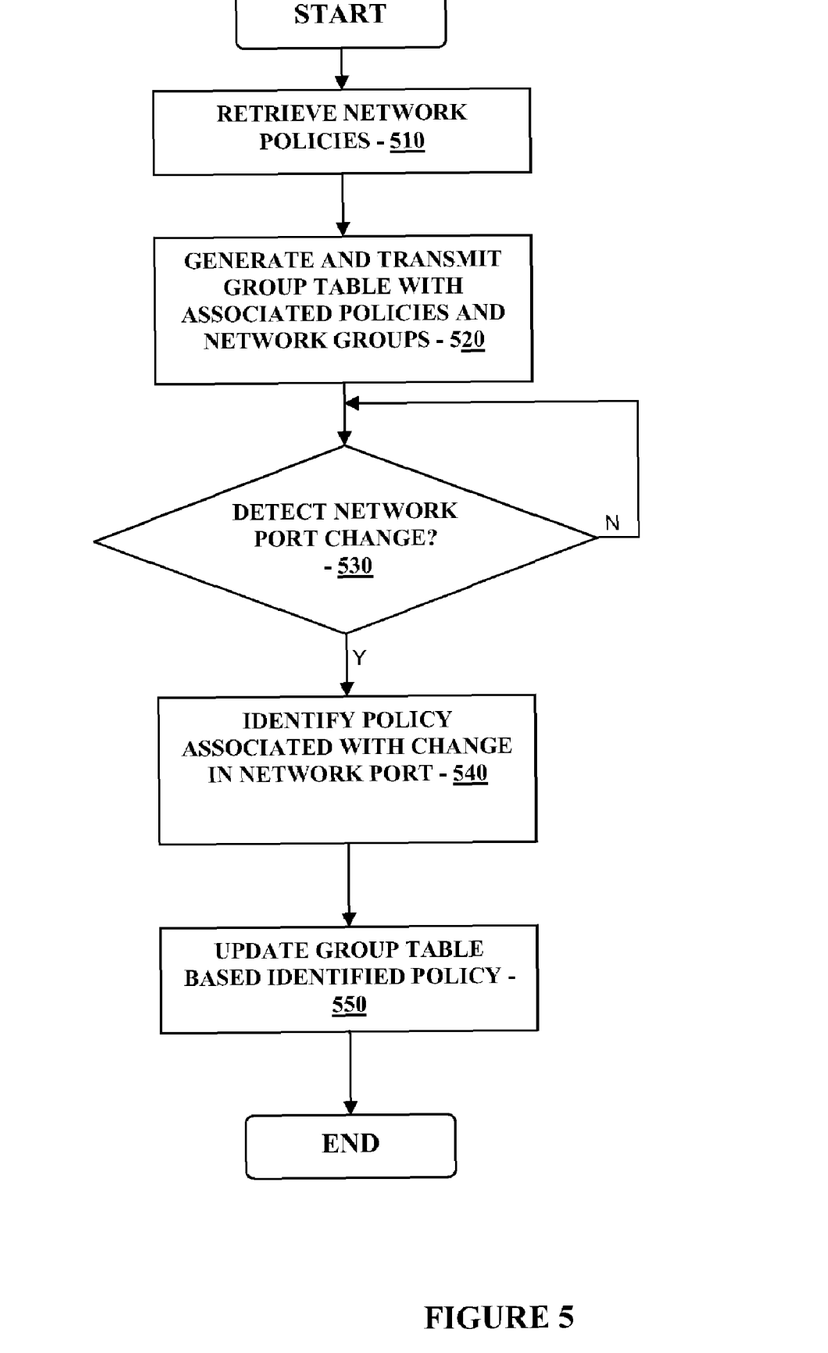
FIG. 5 is a flowchart illustrating the intent based network configuration and management in accordance with one embodiment of the present invention.

FIG. 5 is a flowchart illustrating the intent based network configuration and management in accordance with one embodiment of the present invention. Referring to FIG. 5, in one embodiment of the present invention, at step 510, network policies are retrieved, and a group table associating the logical groups in the network with the network policies is generated and transmitted to network devices at step 520. In one embodiment, the network devices include switchware capable devices configured to apply network policies and/or monitor associated port changes in the network 100.

Referring to FIG. 5, at step 530, it is determined whether any network port change is detected. If no change in the network port which may impact the current network policies is detected, the routine continues to monitor the network 100 for changes which potentially results in a corresponding change to the one or more network policies. On the other hand, if at step 530 network port change is detected, then at step 540, the network policy associated with the detected network port change is identified, and the corresponding group table entry for the network policy associated with the detected network port change is updated. That is, in one embodiment, the central controller unit 110 (FIG. 1A) may be configured to monitor the network configuration for changes which affect the existing network policies, and upon detection of a network change, to update the group table which maintains the current network policies and the associated logical groups to implement any policy change to the appropriate logical group in the network 100 (FIG. 1A).

Figure 6:
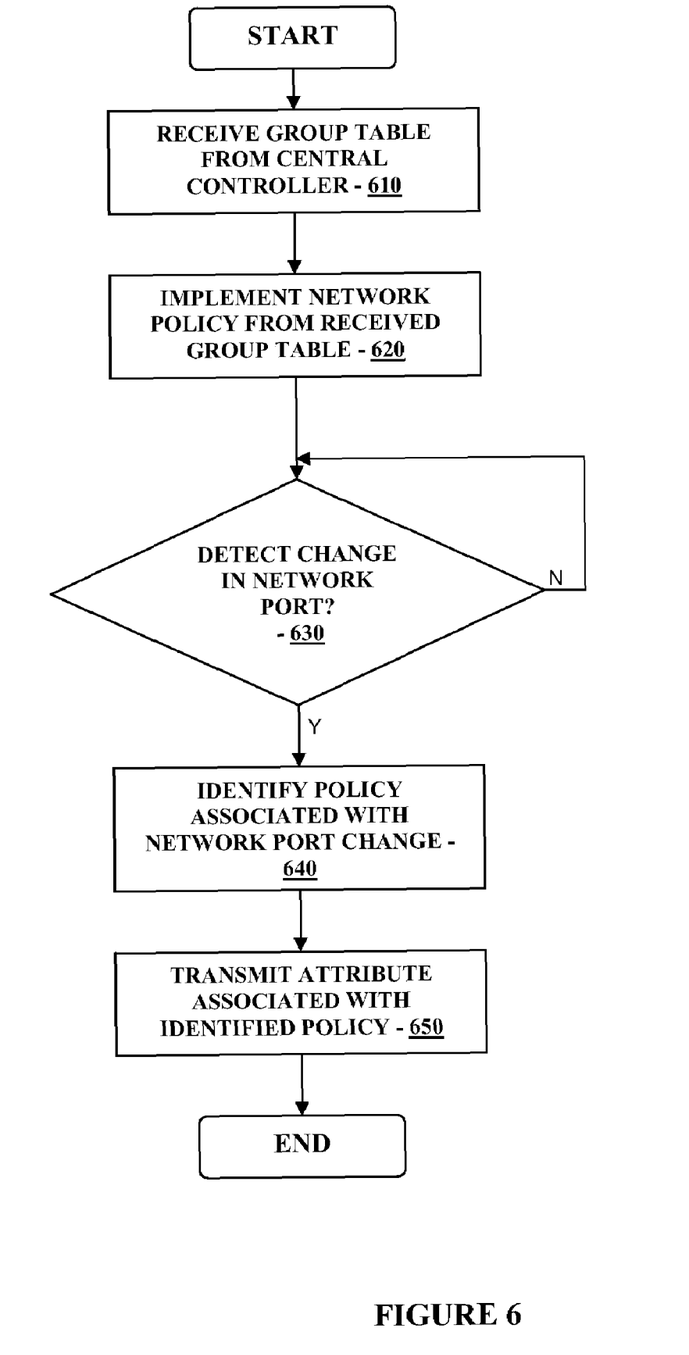
FIG. 6 is a flowchart illustrating intent based network configuration and management executed by a switchware capable device in the network in one embodiment of the present invention.

FIG. 6 is a flowchart illustrating intent based network configuration and management executed by a switchware capable device in the network in one embodiment of the present invention. Referring to FIG. 6, at step 610, a group table including logical groups associated with the respective network group identifier representing the respective network administrative policies is received from the central controller unit 110 (FIG. 1A). Thereafter at step 620, the relevant network policies from the received group table is implemented such that the current, up to date network policies are applied to the network entities associated with the respective logical group corresponding to the current network policies.

Referring again to FIG. 6, at step 630, network ports are monitored to detect for any change such as for example, one or more clients entering or leaving the network 110. If changes to the network ports are not detected, the routine continues to monitor the network ports until such change that may affect the network policies is detected. On the other hand, if a change in the network port is detected, for example, by detecting a client entering or leaving the network, at step 640, the one or more policies associated with the network port change is identified, and thereafter, one or more attributes associated with the identified policies is transmitted to the central controller unit 110 (FIG. 1A).

That is, in one embodiment, as clients enter and withdraw from network ports in the network, the switchware capable devices monitoring the network ports where the client has joined or has left the network, are configured to perform authentication and logical group classification of each new client entering or leaving the network. More specifically, in one embodiment, the switchware capable devices are configured to keep track of current users or clients attached to the local device by port, along with the logical group classifications. Furthermore, in one embodiment, the switchware capable devices are configured to send the port information as well as the logical group classifications to the central controller unit 110 (FIG. 1A).

Accordingly, in one embodiment, the switchware capable devices in the network 100 (FIG. 1A) may be configured to identify and classify data packets by logical groups, with knowledge of group membership of locally-attached clients, per-group policies, and policies between groups as well. Accordingly, the switchware capable devices in one embodiment may be configured to maintain the network policies at the network ports where the clients are attached.

In the manner discussed above, in accordance with one embodiment of the present invention, the dynamic network configuration and management based on predefined administrative intents by the central controller unit 110 renders unnecessary cumbersome and ongoing configuration steps to set up network wide monitoring and configuration based on clients entering or leaving the network. Moreover, the network administrator need not be involved when the monitored entities or monitoring entities migrate within the network 100.

In one embodiment, each port is assigned one physical group, but one or more logical groups may be assigned (or instantiated) on each port. Furthermore, in the case of logical groups, attributes may refer to other logical groups (such as, for example, ACLs), and application of such attributes, when applied, may result in modification of the low level settings of multiple ports. It can be seen that there does not necessarily have to be a one to one correspondence between the high level intent (network level configuration) in the logical groups and the low level settings after they are expanded on the port on which the logical group is instantiated.

As such, in one aspect, the logical groups in the network 100 may retain the relationships between the high level intent based configuration such as the network level configuration and the ports. Moreover, network level configuration may be achieved with configuration through the logical groups since the mapping of the high level intent specifications such as the network level configurations to low level port settings are not limited to settings on the port through which the intent or configuration was specified.

Accordingly, a method of providing dynamic network configuration and management in one embodiment of the present invention includes retrieving one or more attributes associated with one or more logical groups in a network, determining one or more network policies based on the one or more retrieved attributes, associating the one or more logical groups to a respective network group identifier, and generating a network group list associated with the one or more network group identifiers.

In one aspect, the network policies may be associated with one or more network administrative intents.

In another aspect, the network policies may include high level intents associated with the network configuration, where the high level intents may include one or more security policies, quality of service, or combinations thereof.

The method in a further aspect may also include transmitting the network group list to one or more network entities.

In yet another embodiment, the method may also include detecting a change in the network topology, identifying one or more attributes associated with the detected change in the network topology, and updating the network group list based on the one or more identified attributes, where, in one aspect, the change in the network topology may include one or more of a client terminal entering the network, or the client terminal leaving the network.

In accordance with a further embodiment, the change in the network topology may include a network port change in the network.

The method in still another aspect may include applying the updated network group list to one or more network entities in the network.

An apparatus in accordance with another embodiment of the present invention includes a network interface, one or more processors coupled to the network interface; and a memory for storing instructions which, when executed by the one or more processors, causes the one or more processors to retrieve one or more attributes associated with one or more logical groups in a network, determine one or more network policies based on the one or more retrieved attributes, associate the one or more logical groups to a respective network group identifier, and to generate a network group list associated with the one or more network group identifiers.

In accordance with still another embodiment, there is are provided one or more storage devices having processor readable code embodied thereon, the processor readable code for programming one or more processors to perform a method for providing dynamic network configuration and management, the method comprising retrieving one or more attributes associated with one or more logical groups in a network, determining one or more network policies based on the one or more retrieved attributes, associating the one or more logical groups to a respective network group identifier, and generating a network group list associated with the one or more network group identifiers.

In yet a further aspect, the method may further include transmitting the network group list to one or more network entities.

Moreover, in still another aspect, the method may also include detecting a change in the network topology, identifying one or more attributes associated with the detect change in the network topology, and updating the network group list based on the one or more identified attributes.

In yet still a further aspect, the method may further include applying the updated network group list to one or more network entities in a network.

A system of providing dynamic network configuration and management in accordance with still another embodiment of the present invention includes means for retrieving one or more attributes associated with one or more logical groups in a network, means for determining one or more network policies based on the one or more retrieved attributes, means for associating the one or more logical groups to a respective network group identifier, and means for generating a network group list associated with the one or more network group identifiers.

The various processes described above including the processes performed by the central controller unit 110 in the software application execution environment in the data network 100 including the processes and routines described in conjunction with FIGS. 4-6, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the central controller unit 110, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing dynamic network configuration and management, comprising the steps of:
   retrieving, from a first memory, one or more physical group attributes associated with one or more physical groups in a network;
   classifying users of the network into one or more logical groups based on the one or more physical group attributes;
   presenting a logical group tree on a User Interface (UI), the logical group tree having a plurality of interconnected, hierarchically arranged nodes where each node represents a respective one of the one or more logical groups of the network;
   receiving an assignment of logical group attributes to the nodes of the logical group tree, including the assignment of logical group attributes for pairs of nodes in response to the pairs of nodes being connected by reference links;
   storing the hierarchical logical group tree in the first or a second memory;
   retrieving, from the stored hierarchical logical group tree, one or more logical group attributes assigned to the one or more logical groups in the network and to the pairs of logical groups whose nodes are connected by the reference links;
   determining one or more network policies based on the one or more retrieved logical group attributes;
   associating the one or more logical groups to a respective network group identifier;
   generating, by a processor, a network group list associated with the one or more network group identifiers; and
   storing the network group list in the memory.

2. The method of claim 1 wherein the network policies are associated with one or more network administrative intents.

3. The method of claim 1 wherein the network policies include high level intents associated with the network configuration.

4. The method of claim 3 wherein the high level intents include one or more security policies, quality of service, or combinations thereof.

5. The method of claim 1 further including the step of transmitting the network group list to one or more network entities.

6. The method of claim 1 further including:
   detecting a change in the network topology;
   identifying one or more logical group attributes associated with the detect change in the network topology; and
   updating the network group list based on the one or more identified logical group attributes.

7. The method of claim 6 wherein the change in the network topology includes one or more of a client terminal entering the network, or the client terminal leaving the network.

8. The method of claim 6 wherein the change in the network topology includes a network port change in the network.

9. The method of claim 6 further including the step of applying the updated network group list to one or more network entities in the network.

10. An apparatus, comprising:
    a network interface;
    one or more processors coupled to the network interface; and
    a memory for storing instructions which, when executed by the one or more processors, causes the one or more processors to
       retrieve one or more physical group attributes associated with one or more physical groups in a network;
       classify users of the network into one or more logical groups based on the one or more physical group attributes;
       present a logical group tree on a User Interface (UI), the logical group tree having a plurality of interconnected, hierarchically arranged nodes where each node represents a respective one of the one or more logical groups of the network,
       receive an assignment of logical group attributes to the nodes of the logical group tree, including the assignment of logical group attributes for pairs of nodes in response to reference links being established between the pairs of nodes
       retrieve from the logical group tree one or more logical group attributes associated with the one or more logical groups in the a network,
       determine one or more network policies based on the one or more retrieved attributes,
       associate the one or more logical groups to a respective network group identifier, and
       generate a network group list associated with the one or more network group identifiers.

11. One or more storage devices having processor readable code embodied thereon, said processor readable code for programming one or more processors to perform a method for providing dynamic network configuration and management, the method comprising:
    retrieving one or more physical group attributes associated with one or more physical groups in a network;
    classifying users of the network into one or more logical groups based on the one or more physical group attributes;
    presenting a logical group tree on a User Interface (UI), the logical group tree having a plurality of interconnected, hierarchically arranged nodes where each node represents a respective one of the one or more logical groups of the network;
    receiving an association of logical group attributes with the nodes of the logical group tree, including the association of logical group attributes with pairs of nodes in response to the pairs of nodes being connected by reference links;
    retrieving from the logical group tree one or more logical group attributes associated with the one or more logical groups in the network and with the pairs of logical groups whose nodes are connected by reference links;

determining one or more network policies based on the one or more retrieved logical group attributes;

associating the one or more logical groups to a respective network group identifier; and generating a network group list associated with the one or more network group identifiers.

12. The one or more storage devices of claim 11 wherein the network policies are associated with one or more network administrative intents.

13. The one or more storage devices of claim 11 wherein the network policies include high level intents associated with the network configuration.

14. The one or more storage devices of claim 13 wherein the high level intents include one or more security policies, quality of service, or combinations thereof.

15. The one or more storage devices of claim 11 wherein the method further comprises transmitting the network group list to one or more network entities.

16. The one or more storage devices of claim 15 wherein the one or more network entities include one or more switchware capable devices.

17. The one or more storage devices of claim 11 wherein the method further comprises detecting a change in the network topology, identifying one or more logical group attributes associated with the detect change in the network topology, and updating the network group list based on the one or more identified logical group attributes.

18. The one or more storage devices of claim 17 wherein the change in the network topology includes one or more of a client terminal entering the network, or the client terminal leaving the network.

19. The one or more storage devices of claim 17 wherein the change in the network topology includes a network port change in the network.

20. The one or more storage devices of claim 17 wherein the method further includes applying the updated network group list to one or more network entities in a network.

21. A system of providing dynamic network configuration and management, comprising:

means for retrieving one or more physical group attributes associated with one or more physical groups in a network;

means for classifying users of the network into one or more logical groups based on the one or more physical group attributes;

means for presenting a logical group tree on a User Interface (UI), the logical group tree having a plurality of interconnected, hierarchically arranged nodes where each node represents a respective one of the one or more logical groups of the network;

means for receiving an assignment of logical group attributes to the nodes of the logical group tree, including the assignment of logical group attributes for pairs of nodes in response to the pairs of nodes being connected by reference links;

means for retrieving from the logical group tree one or more logical group attributes associated with the one or more logical groups in the network;

means for determining one or more network policies based on the one or more logical group retrieved attributes;

means for associating the one or more logical groups to a respective network group identifier; and means for generating a network group list associated with the one or more network group identifiers.

* * * * *